Patented Feb. 19, 1952

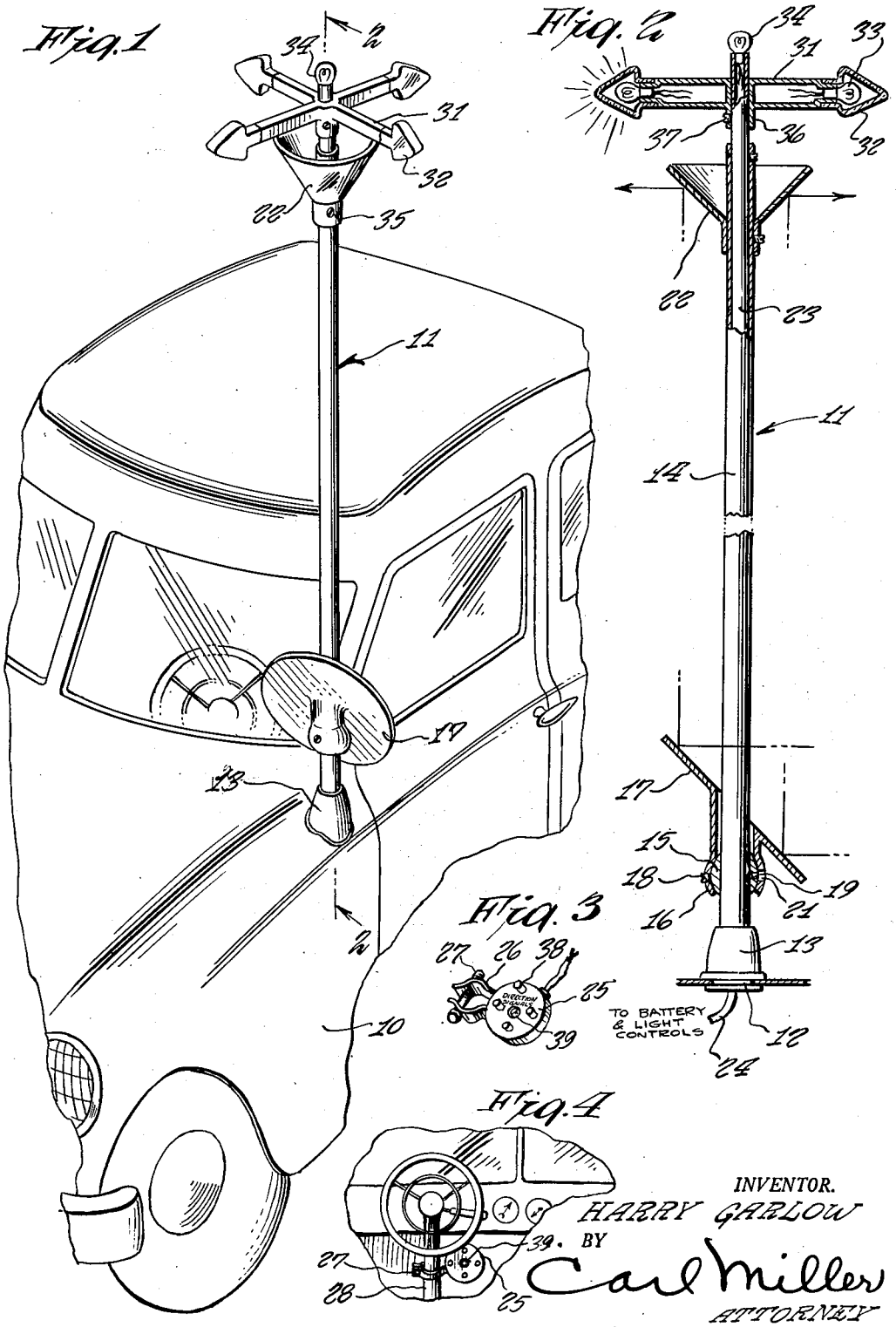

2,586,643

UNITED STATES PATENT OFFICE 2,586,643

COMBINED AUTO MIRROR, RADIO ANTENNA, LIGHT, AND DIRECTIONAL SIGNAL CONSTRUCTION

Harry Garlow, Flemington, N. J.

Application July 30, 1949, Serial No. 107,748

1 Claim. (Cl. 177—329)

This invention relates to a combined auto mirror, radio antenna, light and directional signal construction.

It is an object of the present invention to provide a combined auto mirror, radio antenna, light and directional signal construction all in one unit and adapted to be assembled upon the automobile in the same manner that the antenna of the automobile is assembled thereupon and whereby the operator can from the steering post of the automobile through switches control the operation of the device.

Other objects of the present invention are to provide a combined auto mirror, radio antenna, light and directional signal construction which is of simple construction, inexpensive to manufacture, easy to install upon the automobile, compact, has a minimum number of parts, rugged and efficient in operation.

For other objects and for a better understanding of the invention, reference may be had to the following detailed description taken in connection with the accompanying drawing, in which Fig. 1 is a perspective view of the construction embodying the features of the present invention installed upon an automobile body.

Fig. 2 is a longitudinal sectional view taken generally on line 2—2 of Fig. 1.

Fig. 3 is a perspective view of the switch control member.

Fig. 4 is a front view of an automobile dash and of the steering post upon which the switch control element is mounted.

Referring now to the figures, 10 represents an automobile body on which the construction embodying the features of the present invention and as indicated generally at 11 is mounted. The automobile body is provided with an opening 12 into which a large grommet supporting element 13 is tightly fitted. This grommet has a post or pipe 14 secured to the same. This pipe extends vertically upwardly. Around the bottom end of the pipe there is connected a collar or ball 15 on which a socket formation 16 of an inclined mirror 17 is mounted. This mirror can thus be universally adjusted and fixed in the proper position by set screws 18. The ball 15 is secured in place by a set screw 19 accessible through an opening 21 in the socket. The mirror 17 can accordingly be adjusted vertically or laterally for the proper view by the operator. Above the mirror 17 and at the upper end of the pipe 14 is a funnel, cone or any other suitable shaped mirror 22 from which the object which is received from a point above the car is transmitted to the mirror 17.

Extending through the pipe 14 is a small pipe 23 which carries wires which lead to the battery and light control. This wire is indicated at 24 and is connected to a control element 25 which has spring clips 26 and a fastening screw 27 for securing the same to an automobile steering post 28 within the automobile. This pipe 23 can provide the antenna for the radio.

Upon the upper end of the pipe is a cruxiform member 31 having on the respective ends of the same lamp globes in the shape of arrowheads and as indicated respectively at 32. Also within the ends are lamp bulbs 33. On the upper end of the pipe 23 is a lamp bulb 34. The mirror 22 is held in place by a set screw 35. The cruxiform has a sleeve portion 36 and through it extends a screw 37 for the securement of the cruxiform in place upon the pipe. The directional signals can be operated from the control by pressing the different buttons 38 upon the same. The different lamp bulbs 33 will be operated in sequence. The top light or lamp bulb 34 may be controlled from the main light control of the automobile or can be operated by a switch 39 at the center of the control unit.

While various changes may be made in the detail construction, it shall be understood that such changes shall be within the spirit and scope of the present invention as defined by the appended claim.

Having thus set forth and disclosed the nature of my invention, what is claimed is:

A light and directional signal construction comprising a main pipe, means for securing the main pipe to an automobile, and a central pipe connected through the main pipe, a directional control member on the upper end of the central pipe, comprising two lengthwise and two crosswise extending portions, lamp bulbs upon the directional control element, and a lamp bulb mounted upon the upper end of the small pipe, a control element adapted to be mounted within the automobile and having switch buttons adapted to control the respective lamp bulbs upon the directional control element, cable wires extending from the control element through the pipes and into the directional control element, to light a predetermined lamp bulb at a given time.

HARRY GARLOW.

REFERENCES CITED

The following references are of record in the file of this patent:

UNITED STATES PATENTS

| Number | Name | Date |
|---|---|---|
| 1,368,644 | Mochizuki | Feb. 14, 1921 |
| 1,575,857 | Matthews | Mar. 9, 1926 |
| 1,629,425 | Wardhaugh | May 17, 1927 |
| 2,010,138 | Condon | Aug. 6, 1935 |
| 2,229,520 | Pfingsten | Jan. 26, 1941 |
| 2,366,871 | Pfingsten | Jan. 9, 1945 |
| 2,401,940 | Lange | June 11, 1946 |